United States Patent
Mikulski et al.

(10) Patent No.: US 10,047,891 B2
(45) Date of Patent: Aug. 14, 2018

(54) MULTI-COUPLING WITH SERVICEABLE LOCKING MECHANISM

(71) Applicant: Parker-Hannifin Corporation, Cleveland, OH (US)

(72) Inventors: Jason Mikulski, Bloomington, MN (US); Leonard Nick, Rockford, MN (US); Andrew Holst, Plymouth, MN (US); Timothy Marquis, Otsego, MN (US); Jason Richard Koller, Chaska, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 662 days.

(21) Appl. No.: 14/665,250

(22) Filed: Mar. 23, 2015

(65) Prior Publication Data

US 2015/0308599 A1 Oct. 29, 2015

Related U.S. Application Data

(60) Provisional application No. 61/983,599, filed on Apr. 24, 2014.

(51) Int. Cl.
*F16L 39/00* (2006.01)
*F16L 35/00* (2006.01)
(Continued)

(52) U.S. Cl.
CPC ............ *F16L 39/00* (2013.01); *E21B 33/038* (2013.01); *F16L 1/26* (2013.01); *F16L 41/001* (2013.01)

(58) Field of Classification Search
CPC ... F16L 1/26; F16L 37/56; F16L 39/00; F16L 41/001; F16L 2201/20; E21B 33/038; F16B 37/0892
(Continued)

(56) References Cited

U.S. PATENT DOCUMENTS 3,146,010 A * 8/1964 Werner ................... F16B 21/02
248/27.1
4,615,546 A * 10/1986 Nash ........................ F16L 37/23
285/26
(Continued)

FOREIGN PATENT DOCUMENTS

WO WO-8707928 A1 * 12/1987 ............... F16B 33/02

*Primary Examiner* — James M Hewitt, II
*Assistant Examiner* — Stacy N Warren
(74) *Attorney, Agent, or Firm* — Renner, Otto, Boisselle & Skiar, LLP (57) ABSTRACT

A multi-coupling includes a fixed plate and a free plate, and a primary locking mechanism for locking the free plate to the fixed plate aligned to form multiple fluid passages through the multi-coupling. The primary locking mechanism may include a drive screw secured to the fixed plate engaged with a drive nut secured to the free plate, and a clam shell securing mechanism that secures the drive screw to the fixed plate. The clam shell halves are moveable to release the drive screw from the fixed plate independently of releasing drive screw from the drive nut. The multi-coupling further may include satellite locking mechanisms in combination with the primary locking mechanism. The satellite locking mechanisms may include satellite securing mechanisms that are moveable to release the satellite locking mechanism from the fixed plate. The locking mechanisms are removable while retaining the fixed plate fixed to base equipment.

15 Claims, 8 Drawing Sheets

(51) Int. Cl.
*F16L 1/26* (2006.01)
*F16L 41/00* (2006.01)
*E21B 33/038* (2006.01)

(58) Field of Classification Search
USPC ........ 285/1, 25, 26, 124.1–124.5; 29/402.01, 29/402.03; 411/433, 539; 403/261, 309, 403/313, 344, DIG. 7
See application file for complete search history.

(56) References Cited

U.S. PATENT DOCUMENTS

| | | | | |
|---|---|---|---|---|
| 4,915,419 | A | * | 4/1990 | Smith, III .......... E21B 41/0007 285/124.3 |
| 5,779,609 | A | * | 7/1998 | Cullen ................... B23K 9/287 219/98 |
| 2005/0184510 | A1 | * | 8/2005 | Langenfeld ........... E02F 3/3654 285/124.1 |
| 2005/0285390 | A1 | * | 12/2005 | Martin ................... F16L 37/56 285/124.5 |
| 2013/0309016 | A1 | * | 11/2013 | McKee .................. F16L 1/202 405/170 |

* cited by examiner

MULTI-COUPLING WITH SERVICEABLE LOCKING MECHANISM

RELATED APPLICATION DATA

This application claims priority to U.S. Provisional Patent Application Ser. No. 61/983,599, filed on Apr. 24, 2014, the content of which is incorporated here by reference.

FIELD OF INVENTION

The present invention relates generally to quick couplings, and more particularly to multi-couplings for connecting multiple fluid lines in high pressure systems.

BACKGROUND OF THE INVENTION

Quick couplings in general are common devices for coupling fluid lines, without the need for special tools. Quick couplings, for example, may be configured as individual couplings for the connection of a single fluid line. Individual quick couplings typically have a ball locking mechanism to hold two halves of the coupling together as they try to separate from internal pressures. In common usages, individual quick couplings may be employed to connect sections of a hydraulic fluid line, and the ball locking mechanism operates to prevent separation under the hydraulic pressure.

Alternatively, a quick coupling may be configured as a multi-coupling for connecting any number of multiple fluid lines. The multi-coupling constitutes a group of quick couplings mounted together in a plate or casting. In place of an individual locking mechanism for each individual coupling, a multi-coupling typically has a larger centralized locking mechanism that connects and holds the group of couplings together. The mechanical advantage of this single locking mechanism is often needed to overcome the combined forces required to connect all of the quick couplings simultaneously. A centralized locking mechanism may be employed singularly or in combination with one or more satellite locking mechanisms that supplement the operation of the centralized locking mechanism. There are many industry common locking mechanisms for multi-couplings, including, for example, cam locking mechanisms and screw locking mechanisms as are known in the art.

Multi-couplings may be employed for connecting high pressure fluid lines, often under extreme conditions. For example, multi-couplings are employed for connecting multiple fluid lines associated with offshore and subsea operations. Such multi-couplings may connect fluid lines between the equipment itself and the related control systems. One half of the multi-coupling typically is a fixed plate that is attached to base equipment on the control system side of the system. The other half of the multi-coupling is a free plate that initially is moveable into position for coupling relative to the fixed plate. A locking mechanism as referenced above is then employed to connect the plates. Screw locking mechanisms are commonly used in multi-couplings in deep water operations. The locking mechanism typically includes a drive mechanism for forcing the free plate to join with the fixed plate in a locked configuration.

In deep sea operations, the combination of salt water, high pressures, and other adverse local conditions results in a highly corrosive environment. Accordingly, the materials of the multi-coupling, and particularly the threading joints of the screw locking mechanisms, are selected in part so as to be corrosion resistant. High nickel content metal alloys have proven suitable to resist corrosion under such conditions. Such nickel-based materials, however, also have a high risk of galling as between threaded components of the locking mechanism. As is known the art, "galling" is process by which under high pressures, a friction-based weld undesirably occurs between two sliding surfaces. Galling is particularly common for threaded fastening elements in high pressure environments, and results in the male and female threads being completely welded together rendering the threads useless.

Conventional multi-couplings with a screw-type locking mechanism are useless once galling occurs, because the plates of the multi-coupling cannot be disconnected and re-connected. In the context of deep sea operations, galling generates friction-based welds between the locking mechanism components that join the free plate and the fixed plate of the multi-coupling structure. A galled locking mechanism conventionally must be cut out from the plates, which can ruin the plates and otherwise complicates servicing and maintaining the multi-coupling. In addition, replacing galled locking mechanisms in conventional configurations, if it can be done at all, typically requires that the fixed plate be removed from its base equipment, which is difficult and time consuming.

SUMMARY OF THE INVENTION

A need in the art exists for an improved locking mechanism for a multi-coupling structure for use in high-pressure environments in which galling tends to occur. The present invention provides a serviceable locking mechanism that permits maintenance of the multi-coupling, including removal and replacement of the locking mechanism, while the fixed plate of the multi-coupling may remain in service and attached to base equipment.

A multi-coupling according the present invention may include a fixed plate and a free plate, and a primary locking mechanism for locking the free plate to the fixed plate aligned to form multiple fluid passages through the multi-coupling. The primary locking mechanism may include a drive screw secured to the fixed plate engaged with a drive nut secured to the free plate, and a clam shell securing mechanism that secures the drive screw to the fixed plate. The clam shell halves are moveable to release the drive screw from the fixed plate independently of releasing the drive screw from the drive nut. In this manner, a galled primary locking mechanism, including the drive screw and drive nut galled together, may be removed as a unit while retaining the fixed plate in service attached to the base equipment.

The multi-coupling further may include satellite locking mechanisms in combination with the primary locking mechanism. The satellite locking mechanisms may include satellite securing mechanisms that are moveable to release the satellite locking mechanism from the fixed plate. The components of the satellite locking mechanisms, therefore, are removable as a unit similarly to the primary locking mechanism while retaining the fixed plate attached to base equipment.

An aspect of the invention, therefore, is an enhanced multi-coupling. In exemplary embodiments, the multi-coupling includes a fixed plate including a first set of a plurality of fluid holes for communicating fluid through the fixed plate, a free plate including a second set of a plurality of fluid holes for communicating fluid through the free plate, and a primary locking mechanism for locking the free plate to the fixed plate with the first and second sets of fluid holes being aligned to form a plurality of fluid passages through the multi-coupling. The primary locking mechanism includes a first primary coupler secured to the fixed plate that is engaged with a second primary coupler secured to the free plate. A primary securing mechanism secures the first primary coupler to the fixed plate, and the primary securing mechanism is moveable to release the first primary coupler from the fixed plate independently of releasing the first primary coupler from the second primary coupler.

The primary coupler extends through the fixed plate from an internal side to an external side. The primary securing mechanism may be a clam shell retainer located on the external side of the fixed plate, and halves of the clam shell retainer are movable in an outward radial direction to permit removal of the first primary coupler from the fixed plate. The fixed plate clam shell retainer may be secured to the fixed plate by a plurality of fixed plate clam shell fasteners that extend through corresponding elongated pockets in the fixed plate, and the fixed plate clam shell fasteners are moveable within the elongated pockets to move the fixed plate clam shell halves in the outward radial direction.

The first primary coupler may be a primary drive screw and the second primary coupler may be a primary drive nut that threadedly receives the primary drive screw. The primary drive nut is rotatable relative to the primary drive screw to lock the free plate to the fixed plate.

The multi-coupling further may include at least one satellite locking mechanism in combination with the primary locking mechanism. The satellite locking mechanism may include a first satellite coupler secured to the fixed plate that is engaged with a second satellite coupler secured to the free plate. A satellite securing mechanism secures the first satellite coupler to the fixed plate, and the satellite securing mechanism is moveable to release the first satellite coupler from the fixed plate independently of releasing the first satellite coupler from the second satellite coupler. The first satellite coupler may be a satellite drive screw and the second satellite coupler may be a satellite drive nut that threadedly receives the satellite drive screw. The satellite drive nut is rotatable relative to the satellite drive screw to further lock the free plate to the fixed plate. In an exemplary configuration, the multi-coupling has four satellite locking mechanisms regularly spaced around the primary locking mechanism.

Another aspect of the invention is a method of servicing the described multi-coupling. In exemplary embodiments, the method of servicing the multi-coupling includes the step of moving the primary securing mechanism to release the first primary coupler from the fixed plate independently of releasing the first primary coupler from the second primary coupler. The step of moving the primary securing mechanism to release the first primary coupler from the fixed plate may include moving halves of the fixed plate clam shell retainer in an outward radial direction to free the first primary coupler, and removing the first primary coupler from the fixed plate. The step of moving the primary securing mechanism may include moving the fixed plate clam shell fasteners within the elongated pockets to move the fixed plate clam shell halves in the outward radial direction to free the first primary coupler.

The method of servicing the described multi-coupling further may include removing the free plate from the fixed plate prior to moving the primary securing mechanism. In exemplary embodiments further including the at least one satellite locking mechanism in combination with the primary locking mechanism, the method further may include the step of, after removing the free plate, removing the at least one satellite locking mechanism from the fixed plate and moving the primary securing mechanism.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 1:
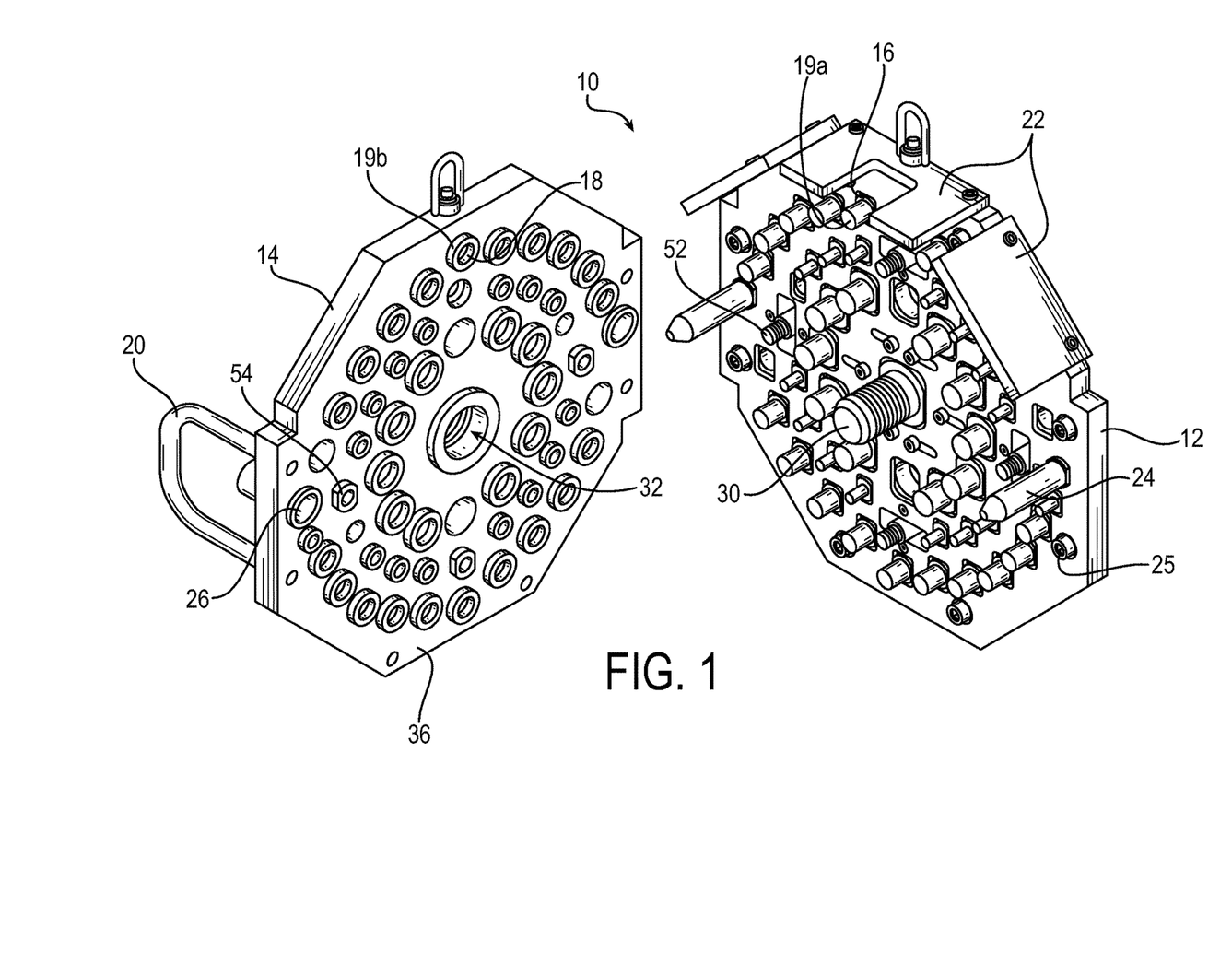
FIG. 1 is a schematic diagram depicting a perspective view of fixed plate and free plate components of an exemplary multi-coupling in accordance with embodiments of the present invention, with the plates being viewed on the internal side of the coupling.
Figure 2:
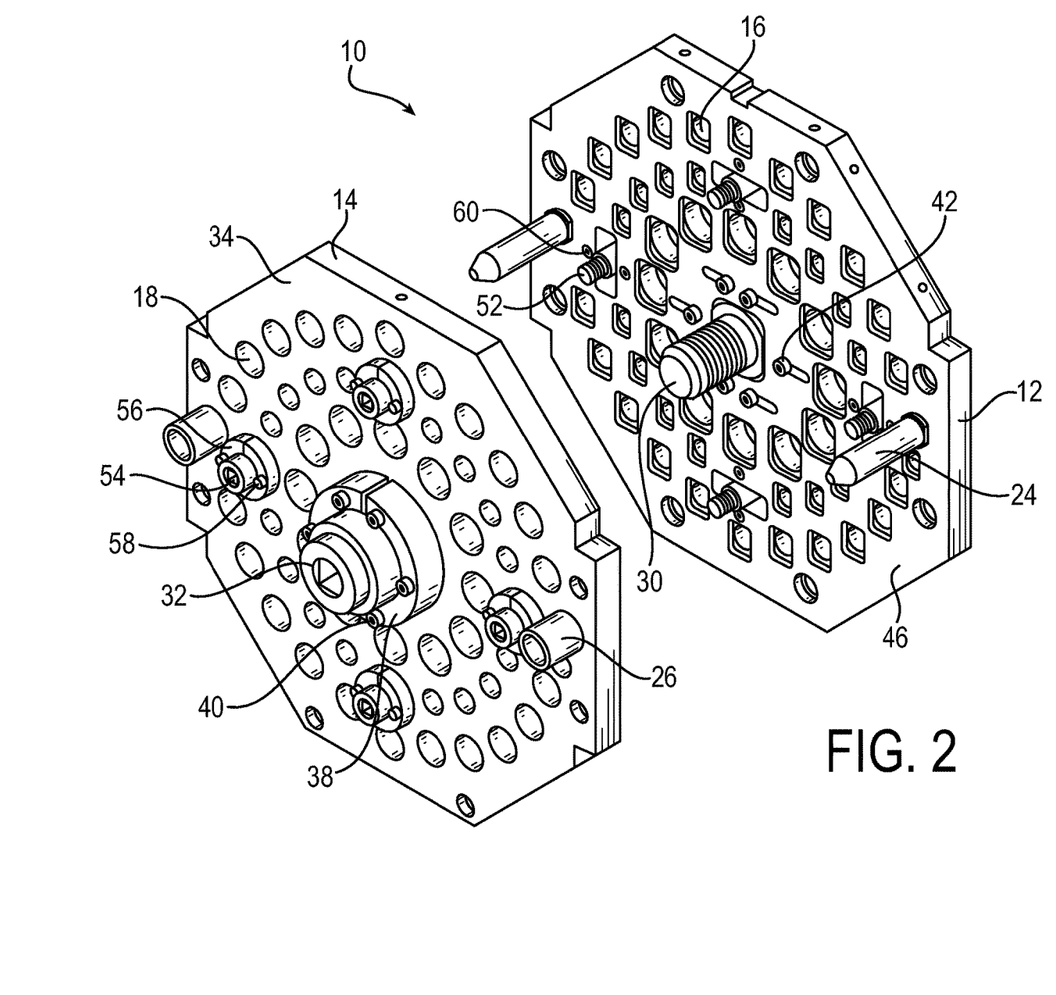
FIG. 2 is a schematic diagram depicting another perspective view of the fixed plate and free plate components of the exemplary multi-coupling of FIG. 1, with the free plate being viewed on the external side of the coupling.
Figure 3:
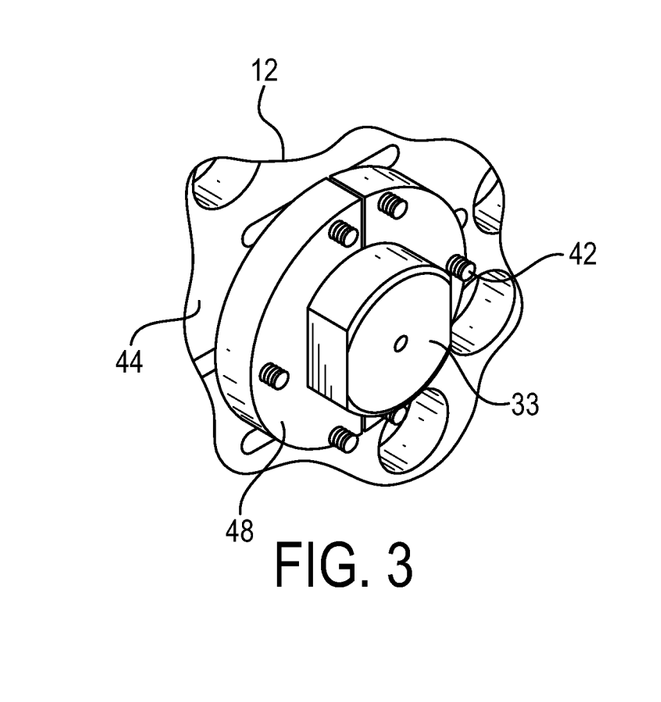
FIG. 3 is a schematic diagram depicting a perspective view of a portion of the external side of the fixed plate of the multi-coupling of FIGS. 1 and 2 in the area of the primary locking mechanism.
Figure 4:
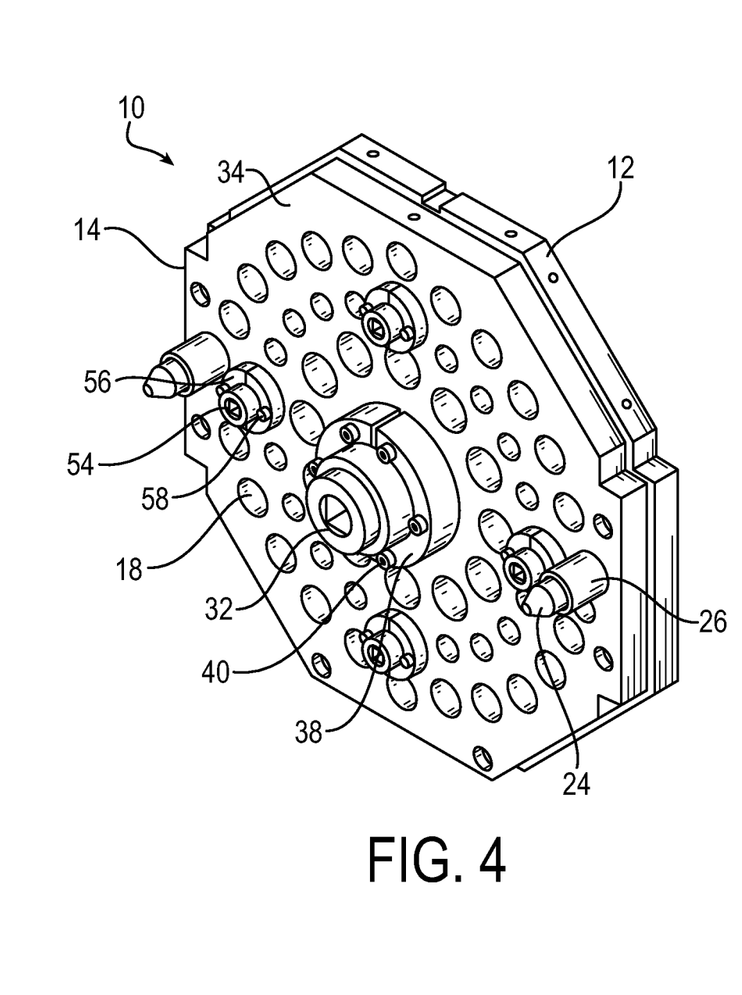
FIG. 4 is a schematic diagram depicting another perspective view of the fixed plate and free plate components of the exemplary multi-coupling of FIGS. 1 and 2, with the free plate and fixed plate being joined together in a locked configuration.

FIGS. 1-4 depict various views of an exemplary multi-coupling 10 including a fixed plate 12 and a free plate 14 in accordance with embodiments of the present invention. Accordingly, like components in FIGS. 1-4 are identified with like reference numerals. In particular, FIG. 1 is a schematic diagram depicting a perspective view of the fixed plate and free plate components of the exemplary multi-coupling 10, with the free plate 14 being viewed from the internal side facing the fixed plate 12. FIG. 2 is a schematic diagram depicting another perspective view of the fixed plate and free plate components of the exemplary multi-coupling 10 of FIG. 1, with the free plate 14 being viewed from the external side facing away from the fixed plate 12. FIG. 3 is a schematic diagram depicting a perspective view of a portion of the external side of the fixed plate 12 in the area of the primary locking mechanism. FIG. 4 is a schematic diagram depicting another perspective view of the fixed plate and free plate components of the exemplary multi-coupling 10, with the fixed plate 12 and free plate 14 being joined together in a locked configuration.

Referring to FIGS. 1-4, the multi-coupling 10, as indicated above, includes a fixed plate 12 and a free plate 14. The fixed plate 12 may be fixed to any suitable base equipment. Typically in a deep sea system, in use the fixed plate 12 would be fixed or mounted to the apparatus prior to forming the locked multi-coupling. The fixed plate 12 includes a plurality of first fluid holes 16 for communicating fluid through the fixed plate from fluid passages for working fluids as may be utilized in the system. As shown in the figures, the number of fluid passages may be numerous and of varied diameters, and it will be appreciated that any number, size, and configuration of fluid holes in the fixed plate may be employed as appropriate to any particular application. The free plate 14 includes a plurality of second fluid holes 18 for communicating fluid through the free plate. The second fluid holes 18 correspond to the first fluid holes 16, to form complete fluid passages through the multi-coupling 10.

As seen best in FIG. 1, in this example the first fluid openings 16 have individual coupling components 19a that cooperate with individual fluid coupling components 19b that extend from the second fluid holes 18. This provides a sealing engagement of the fluid openings to form fluid passages, and may also include any appropriate additional sealing elements. Accordingly, the individual coupling mechanisms may be employed for coupling the individual fluid passages. The individual couplings that may be employed are not shown in FIGS. 2-4 for convenient illustration of the multi-coupling 10 and its associated locking mechanisms.

In a typical operation of forming a locked multi-coupling, the free plate is moved into position relative to the fixed plate to align the locking mechanisms, and thereby align the fluid openings of the fixed plate and the free plate to form complete fluid passages through the multi-coupling. To aid in positioning the free plate, the free plate may include a grab bar 20 that may be manipulated by an operator for moving the free plate into proper positioning. The fixed plate may include one or more shelter components 22 that shield any protruding structures of the locking mechanism and related fastening elements and individual coupling components, as the free plate is moved into proper alignment with the fixed plate. In FIGS. 2 and 4, the grab bar and shelter elements have been removed for more convenient illustration of other features. To further aid in aligning the fixed and free plates, the fixed plate may include a plurality of guide pins 24. The free plate is moved into position with the guide pins 24 being inserted through a corresponding plurality of guide bushings 26, thereby properly aligning the free plate relative to the fixed plate.

A plurality of fastening elements 25 may be employed to attach the fixed plate 12 to any suitable base equipment. Various types of fastening elements, including screw type fasteners, bolt type fasteners, and others are known in the art to secure the fixed plate to base equipment.

In exemplary embodiments, an overall locking mechanism may include a primary locking mechanism and one or more satellite locking mechanisms. The primary and satellite locking mechanisms are formed by cooperating structures on the fixed plate and the free plate. The cooperating structures of the primary locking mechanism broadly may be referred to as a first primary coupler secured to the fixed plate that is engaged with a second primary coupler secured to the free plate. In exemplary embodiments, the first primary coupler may be a male primary drive screw and the second primary coupler may be a female primary drive nut. Such components, however, may be reversed, and the first primary coupler may be the female primary drive nut and the second primary coupler may be the male primary drive screw. A primary securing mechanism secures the first primary coupler to the fixed plate, and the securing mechanism is moveable to release the first primary coupler from the fixed plate independently of releasing the first primary coupler from the second primary coupler. In this manner, a galled primary locking mechanism, including the first primary coupler and second primary coupler galled together, may be removed as a unit while retaining the fixed plate in service attached to the base equipment.

Similarly, the cooperating structures of the satellite locking mechanism broadly may be referred to as a first satellite coupler secured to the fixed plate that is engaged with a second satellite coupler secured to the free plate. In exemplary embodiments, the first satellite coupler may be a male satellite drive screw and the second satellite coupler may be a female satellite drive nut. Again, however, such components may be reversed, and the first satellite coupler may be the female primary drive nut and the second satellite coupler may be the male satellite drive screw. A satellite securing mechanism secures the first satellite coupler to the fixed plate, and the satellite securing mechanism is moveable to release the first satellite coupler from the fixed plate independently of releasing the first satellite coupler from the second satellite coupler. The components of the satellite locking mechanisms, therefore, are removable as a unit similarly to the primary locking mechanism while retaining the fixed plate fixed to base equipment.

In the example configuration of FIGS. 1-4, all male components are provided on the fixed plate 12, and all female configured components are provided on the free plate 14. In addition, the overall locking mechanism includes a centralized locking mechanism and four satellite locking mechanisms regularly spaced around the primary locking mechanism at 12:00, 3:00, 6:00, and 9:00 positions. Such configuration is a non-limiting example provided for purpose of illustration, and the precise number and locations of primary and satellite locking mechanisms may be varied as appropriate to the particular application.

Referring to FIG. 2 in particular, a primary locking mechanism may include a primary drive screw 30 on the fixed plate 12 that is received within a primary drive nut 32 on the free plate 14. Referring briefly also to FIG. 1, it is shown that the primary drive nut 32 extends through the free plate 14 from an external side 34 (FIG. 2) to an internal side 36 (FIG. 1). As seen in the external side view of FIG. 2, the primary locking mechanism further may include a primary drive nut clam shell retainer 38 that is positioned against the free plate utilizing a plurality of primary drive nut clam shell fasteners, such as for example bolts 40. As further explained below, the clam shell 38 is received within a recess in the primary drive nut 32 (the recess is covered by the clam shell in FIG. 2) to hold the primary drive nut in place. Similarly, the primary locking mechanism further may include a primary drive screw clam shell (not seen in FIG. 2) that is positioned against the fixed plate utilizing a plurality of primary drive screw claim shell fasteners, such as for example the bolts 42, the ends of which are seen in FIG. 2 protruding through the fixed plate 12.

Referring also to FIG. 3, it is shown that the primary drive screw 30 extends through the fixed plate 12 from an external side 44 (FIG. 3) to an internal side 46 (FIG. 2). FIG. 3 depicts the external side 44 of the fixed plate 12 in the area of primary locking mechanism. On the external side, the primary drive screw 30 ends in a screw head 33. The primary locking mechanism further may include a primary securing mechanism configured as a primary drive screw clam shell retainer 48 that is positioned against the fixed plate utilizing the plurality of primary drive screw clam shell fasteners, such as primary drive screw clam shell bolts 42. In the locked position, the two halves of the claim shell 48 are received within a recess in the primary drive screw 30 adjacent to the screw head 33 (the recess is covered by the clam shell 48 in FIG. 3) to hold the primary drive screw in place.

The satellite locking mechanisms may have a similar structure as the primary locking mechanism, particularly on the external side, and typically with smaller sized components. In the example of FIGS. 1-4, as referenced above the multi-coupling includes four satellite locking mechanisms that are regularly spaced around the primary locking mechanism. The precise number and locations of satellite locking mechanism may be varied as appropriate to the particular application.

Referring to FIG. 2 in particular, each satellite locking mechanism may include a satellite drive screw 52 on the fixed plate 12 that is received within a satellite drive nut 54 on the free plate 14. Each satellite drive nut 54 extends through the free plate 14 from the external side 34 to the internal side 36. Each satellite locking mechanism further may include a satellite drive nut clam shell retainer 56 that is positioned against the free plate utilizing a plurality of satellite drive nut clam shell bolts 58. As further explained below, each clam shell 56 is received within a recess in a respective satellite drive nut 54 to hold the satellite drive nut in place (the recesses are covered by the clam shells 56 in FIGS. 2 and 4). Similarly, in each satellite locking mechanism the satellite drive screws 52 may be secured in the fixed plate 12 utilizing a plurality of satellite drive screw bolts 60.

The multi-coupling 10 may be assembled as follows. As referenced above, the free plate 14 is moved into position with the plurality of guide pins 24 of the fixed plate 12 being inserted through the corresponding plurality of guide bushings 26 of the free plate. This serves to align the plates initially. As the free plate is moved closer towards the fixed plate, males threads of the primary drive screw 30 come into contact with female threads of the primary drive nut 32. A user would then rotate the primary drive nut 32 relative to the free plate using a suitable drive mechanism as is known in the art, until the primary drive nut 32 is bottomed out on the primary drive screw 30.

In exemplary embodiments, the components of the primary locking mechanism are engaged before a proper mating distance for the components of the satellite locking mechanisms is achieved. This provides a proper sequencing for securing the free and fixed plates together, by which securing the primary locking mechanism is performed first to properly align the plates, followed by the securing of satellite locking mechanism as further described below.

Next a user would slide the satellite drive nuts 54 through the free plate 14 and into the satellite drive screws 52, until the female threads of the satellite drive nuts 54 make contact with male threads on the satellite drive screws 52. Once contact is made, as to each satellite drive screw/nut assembly, the user would rotate the satellite drive nuts 54 relative to the free plate 14 using any suitable drive mechanism as is known in the art, until the satellite drive nut 54 is bottomed out on the respective satellite drive screw 52. Further tightening of the satellite drive nuts would not necessarily operate to move the free and fixed plates together, this being already achieved by the primary locking mechanism, but ultimately provides additional load carrying capability to handle the separation forces from the various couplings. FIG. 4 is a schematic diagram depicting the components of the exemplary multi-coupling 10, with the free plate 14 and fixed plate 12 being joined together in a locked configuration resulting from the above assembly operations.

Under optimal circumstances (i.e., in the absence of galling), a reverse series of operations may be utilized to disconnect the free plate from the fixed plate. In the event any of the drive screw/nut assemblies of the locking mechanism are galled, however, conventional configurations would require cutting out the galled structures from the plates, which could render the plates useless. To do so further would require removal of the fixed plate from the base equipment, which is difficult and time consuming.

The present invention avoids such issues by providing a configuration in which the locking mechanism, including the various drive screw/nut assemblies, is serviceable for removal and replacement of galled threaded locking components without having to remove the fixed plate from the base equipment to which the fixed plate is secured. Damage to the plates is avoided, and maintenance is more efficient by also avoiding the removal of the fixed plate from service.

Accordingly, another aspect of the invention is a method of servicing the described multi-coupling. In exemplary embodiments, the method of servicing the multi-coupling includes the step of moving the primary securing mechanism (clam shell retainer) to release the first primary coupler (primary drive screw) from the fixed plate independently of releasing the first primary coupler from the second primary coupler (primary drive nut). The step of moving the primary securing mechanism to release the first primary coupler from the fixed plate may include moving halves of the fixed plate clam shell retainer in an outward radial direction to free the first primary coupler, and removing the first primary coupler from the fixed plate. The method of servicing the multi-coupling further may include removing the free plate from the fixed plate prior to moving the primary securing mechanism. In exemplary embodiments further including the at least one satellite locking mechanism in combination with the primary locking mechanism, the method further may include the step of, after removing the free plate, removing the at least one satellite locking mechanism from the fixed plate prior to moving the primary securing mechanism.

In the event the various coupling elements have remained non-galled, disassembly may be achieved by simple unthreading of the components of the locking mechanisms, as is conventional. The present invention, however, provides for efficient disassembly when one or more of the locking mechanism components are galled, in which case simple unthreading is not possible. In accordance with the exemplary multi-coupling depicted in FIGS. 1-4, the disassembly procedure associated for servicing the multi-coupling with galled components may be described in connection with the following three general stages of the disassembly operation: (1) removal of the free plate from the fixed plate; (2) removal of the satellite drive screw/nut assemblies that form the satellite locking mechanisms; and (3) removal of the primary drive screw/nut assembly that forms the primary locking mechanism.

FIGS. 5A-5D are schematic diagrams depicting a series of operations for removal of the free plate 14 from the fixed plate 12. Like components are referred to with like reference numerals as in FIGS. 1-4. As a first step depicted in FIG. 5A, from the external side 34 of the free plate 14, all of the primary and satellite clam shell fasteners are removed. In particular, the primary drive nut clam shell bolts 40 are removed from the securing position relative to the primary drive nut clam shell 38, and the satellite drive nut clam shell bolts 58 are removed from the securing position relative to the satellite drive nut clam shells 56.

Figure 5A:
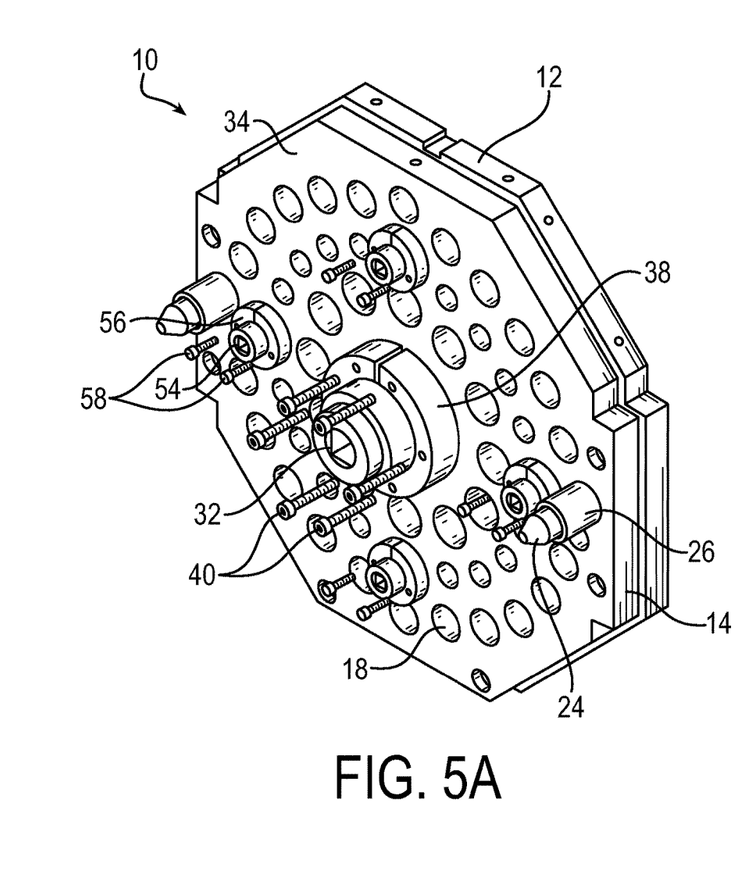
FIGS. 5A-5D are schematic diagrams depicting a series of operations for removal of the free plate from the fixed plate relative to disassembly of the multi-coupling of FIG. 4.
Figure 5B:
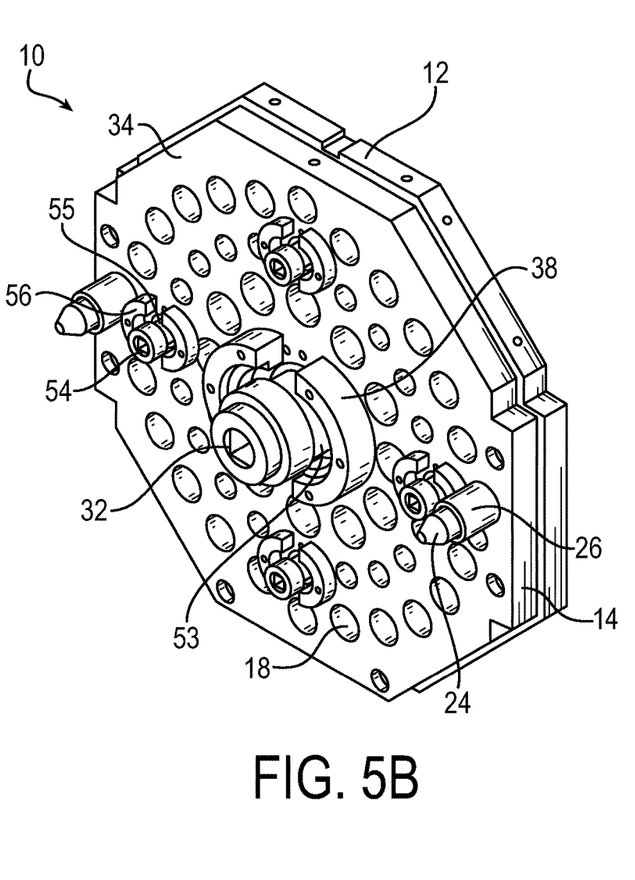
Figure 5C:
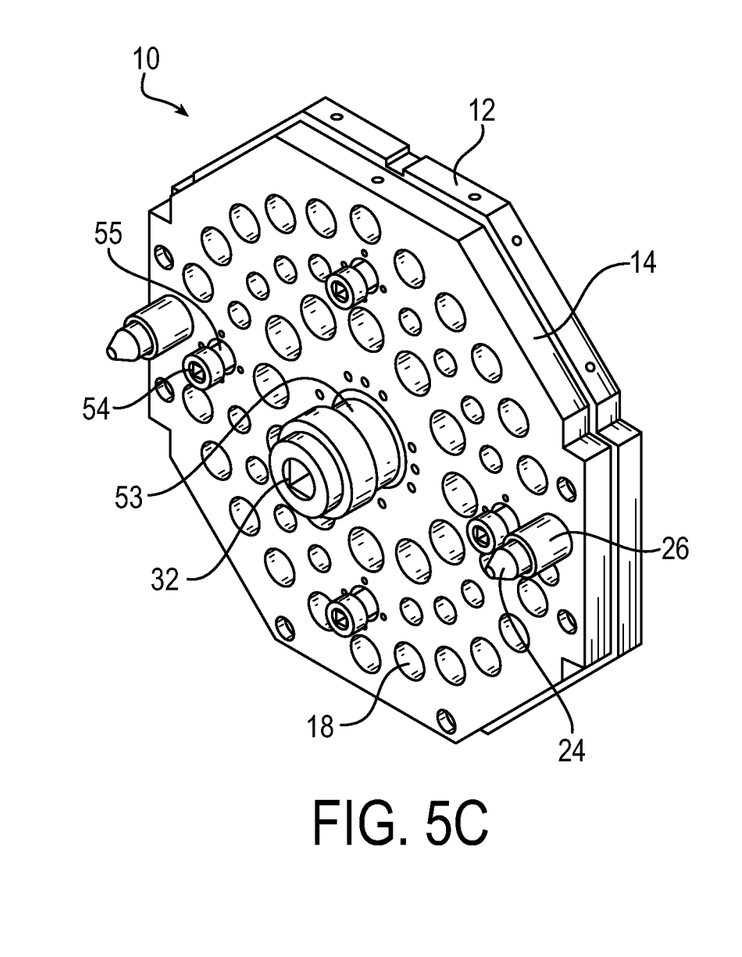

As seen in FIGS. 5B and 5C, with the various clam shell bolts removed, the various clam shell halves can be slid radially outward from engagement with recesses in the respective drive nuts. In particular, halves of the primary drive nut clam shell 38 may be removed from engagement with a recess 53 in the primary drive nut 32, independently of the primary drive nut (second primary coupler). Similarly, halves of the satellite drive nut clam shells 56 may be removed from engagement with a recess 55 in the satellite drive nuts 54, independently of the satellite drive nuts (second satellite coupler). FIG. 5B specifically shows the clam shell halves as they are moved radially from the respective drive nuts, and FIG. 5C depicts the resultant state in which the clam shells have been fully removed.

Figure 5D:
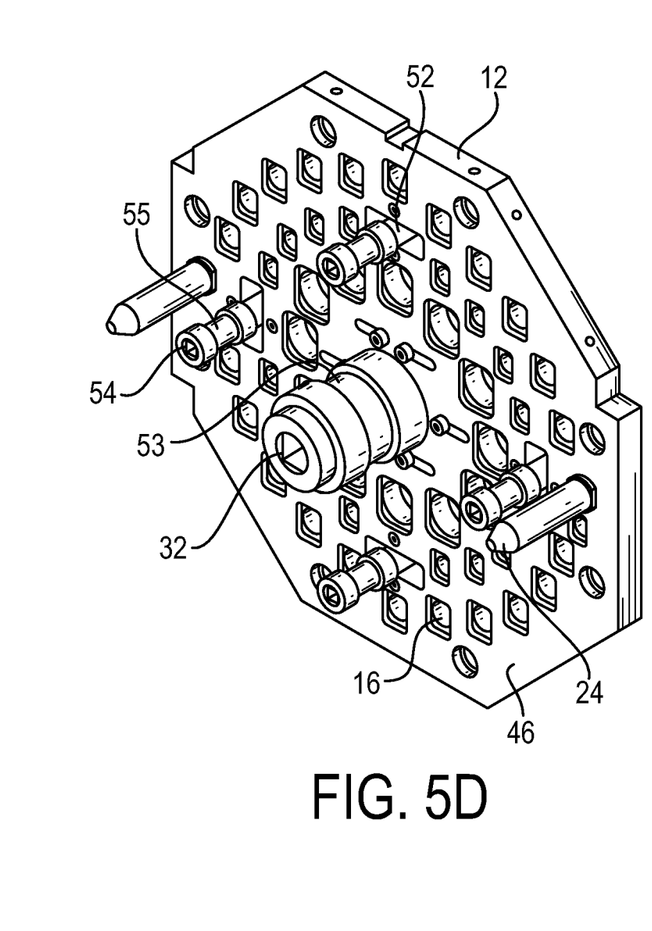

Once the various clam shell bolts and claim shells have been removed from the drive nuts on the external side of the free plate, the free plate can be removed by sliding the free plate off of the plurality guide pins 24. FIG. 5D shows the exposed internal side 46 of the fixed plate 12 upon removal of the free plate. As seen in FIG. 5D, the primary drive nut 32 (second primary coupler) has remained engaged with the primary drive screw (first primary coupler, which extends internally within the primary drive nut in FIG. 5D), and the satellite drive nuts 54 (second satellite couplers) have remained engaged with the satellite drive screws (first satellite couplers, which extend internally within the satellite drive nuts in FIG. 5D). The primary and satellite drive screws have remained secure to the fixed plate. In the event galling has occurred, one or more of the drive nuts effectively may be friction-welded to a respective drive screw, meaning that the screw and nut components are not readily removable from each other. The present invention permits removal of entire galled drive screw/nut assemblies without any cutting of the components, and while the fixed plate remains secured to base equipment.

Figure 6A:
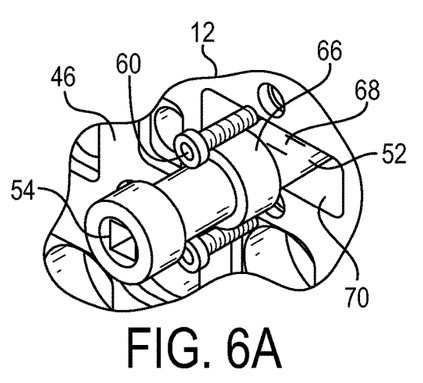
FIGS. 6A-6E are schematic diagrams depicting a series of operations for removal of satellite drive screw/nut assemblies from the fixed plate relative to disassembly of the multi-coupling of FIG. 4.
Figure 6B:
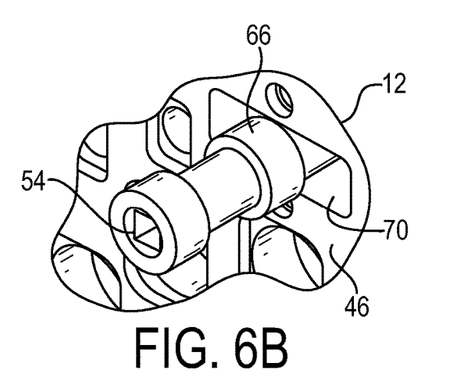
Figure 6C:
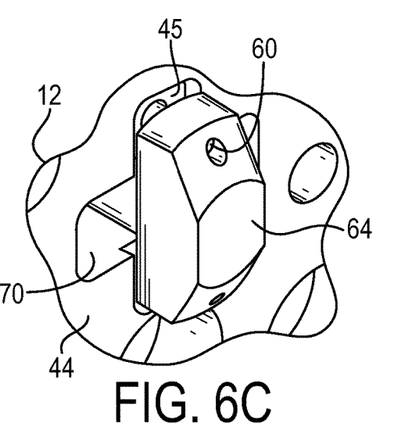

FIGS. 6A-6E are schematic diagrams depicting a series of operations for removal of the satellite drive screw/nut assemblies 52/54 from the fixed plate 12, relative to disassembly of the multi-coupling of FIG. 4. Like components are referred to with like reference numerals as in FIGS. 1-4. Referring initially to FIGS. 6A-6C, as referenced above, in each satellite locking mechanism the satellite drive screws 52 (first satellite couplers) may be secured in the fixed plate utilizing a plurality of fasteners, such as satellite drive screw bolts 60. In the secured configuration, the satellite drive screw bolts 60 extend through the fixed plate 12 into a widened end in the form of a T-bolt end 64 that rests against a recess 45 in the external side 44 of the fixed plate 12, as particularly seen in FIG. 6C. The satellite securing mechanism is configured as follows to fix the satellite drive screws to the fixed plate. When the satellite drive screw bolts 60 are tightened (such as in FIGS. 1-4), a ridge 66 of the satellite drive nut 54 actually is positioned slightly spaced apart from the internal side 46 of the fixed plate. This slight space is identified as element 68 in FIG. 6A. In the secured configuration, the widened end (T-bolt end) 64 of the drive screw is secured tightly against the recess 45 in the external side 44, and transversely oriented to a drive screw slot 70. With such transverse orientation, the T-bolt end cannot fit through the fixed plate, thereby securing the satellite drive screw in place.

Removing the satellite locking mechanism from the fixed plate includes moving the satellite securing mechanism to release the first satellite coupler (satellite drive screw) from the fixed plate independently of releasing the first satellite coupler from the second satellite coupler (satellite drive nut). Such step may include rotating the satellite locking mechanism from the locked position to an unlocked position in which the widened end is oriented commensurately with the slot to permit removal of the first satellite coupler from the fixed plate.

Figure 6D:
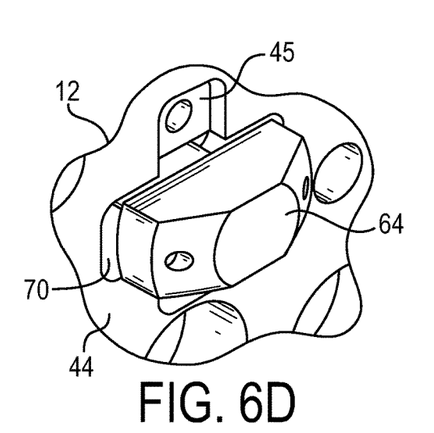
Figure 6E:
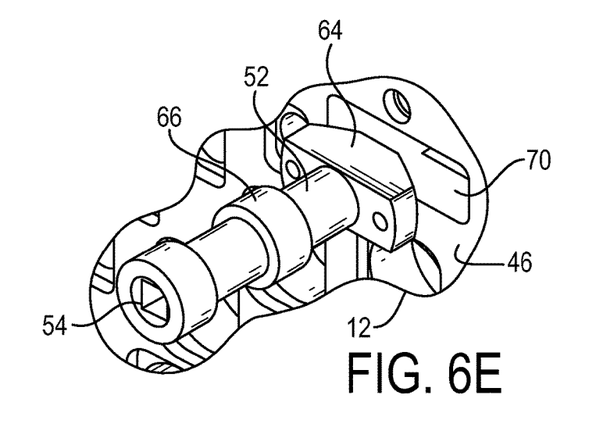

As seen in example disassembly operations of FIGS. 6A-6E, a first step to remove the satellite drive screw/nut assemblies 52/54 from the fixed plate 12 is depicted FIG. 6A. Such step is to remove the satellite drive screw bolts 60. Once the satellite drive screw bolts 60 are removed, the satellite drive screw/nut assembly 52/54 can be moved relative to the fixed plate 12. The satellite drive screw/nut assembly 52/54 first may be pushed toward the fixed plate. As referenced above, in the secured position the ridge 66 of the satellite drive nut 54 is positioned slightly spaced apart from the internal side 46 of the fixed plate. The push operation eliminates this space such that the ridge 66 becomes pressed against the internal side 46 of the fixed plate, as shown in FIG. 6B. Commensurately, the T-bolt end 64 of the satellite drive screw is pushed away from the recess 45 in the external side 44 of the fixed plate, as shown in FIG. 6C. As shown in FIG. 6D, the satellite drive screw/nut assembly 52/54 may be rotated to orient the T-bolt end 64 commensurately with the drive screw slot 70. The entire satellite drive screw/nut assembly 52/54 then can be removed by pulling the T-bolt end 64 through the slot 70, as shown in FIG. 6E.

In this manner, the satellite drive screw/nut assembly 52/54 may be removed from the fixed plate 12 as a unit. Accordingly, even if the satellite drive nut 54 and satellite drive screw 52 are galled together, the assembly is readily removed without having to cut the components apart, and without having to remove the fixed plate 12 from the base equipment.

FIGS. 7A-7D are schematic diagrams depicting a series of operations for removal of the primary drive screw/nut assembly 30/32 from the fixed plate 12 relative to disassembly of the multi-coupling of FIG. 4. Generally, the method of servicing the multi-coupling may include the step of moving the primary securing mechanism to release the first primary coupler from the fixed plate independently of releasing the first primary coupler from the second primary coupler. As described above, in exemplary embodiments the first primary coupler (primary drive screw) extends through the fixed plate from an internal side to an external side, and the primary securing mechanism is a clam shell retainer located on the external side of the fixed plate. The primary securing mechanism may be moved to release the first primary coupler from the fixed plate, such as by moving halves of the fixed plate clam shell retainer in an outward radial direction to free the first primary coupler. The fixed plate clam shell retainer may be secured to the fixed plate by a plurality of fixed plate clam shell fasteners that extend through corresponding elongated pockets in the fixed plate. The fixed plate clam shell fasteners may be moved within the elongated pockets to move the fixed plate clam shell halves in the outward radial direction to free the primary first primary coupler.

Figure 7A:
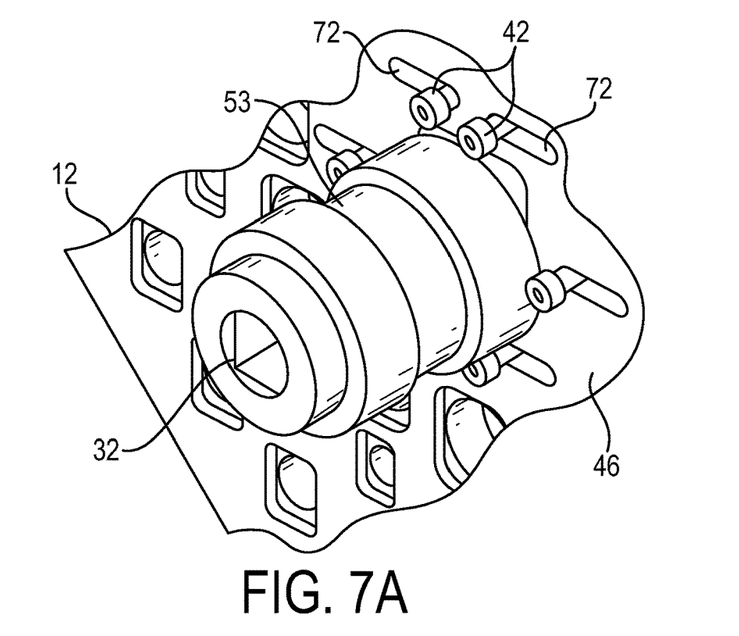
FIGS. 7A-7D are schematic diagrams depicting a series of operations for removal of a primary drive screw/nut assembly from the fixed plate relative to disassembly of the multi-coupling of FIG. 4.

Referring to the example of FIGS. 7A-7D, like components are referred to with like reference numerals as in FIGS. 1-4. As referenced above in connection with FIG. 3, on the external side 44 of the fixed plate, the primary drive screw clam shell 48 is positioned against the fixed plate utilizing the plurality of primary drive nut clam shell bolts 42 to hold the primary drive screw in place. As seen in FIG. 7A depicting the internal side 46 of the fixed plate, the primary drive nut claim shell bolts 42 are located within elongated pockets 72. As a first step for removal of the primary drive screw/nut assembly 30/32, the primary drive nut clam shell bolts 42 are loosened so that the heads of such bolts become raised above the internal side 46 of the fixed plate 12, as shown in FIG. 7A.

Figure 7B:
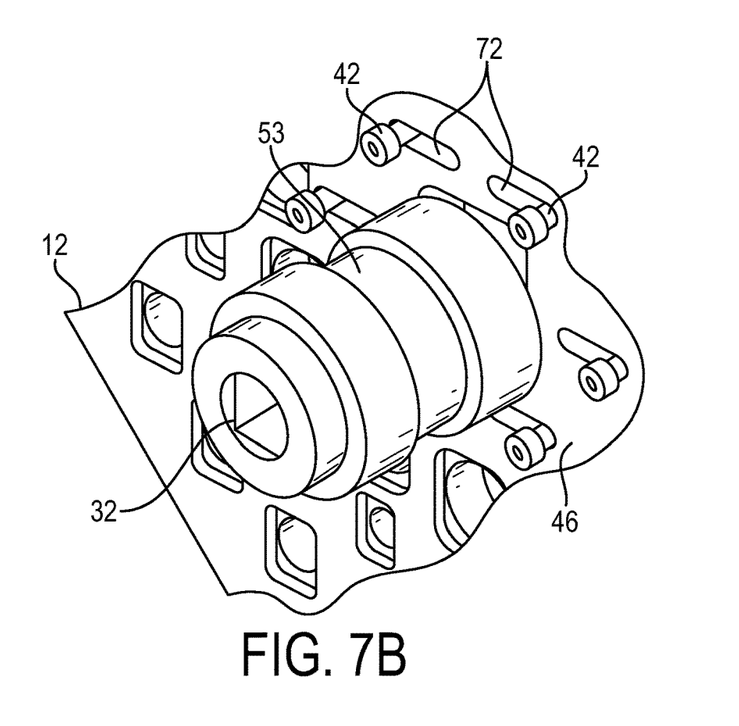
Figure 7C:
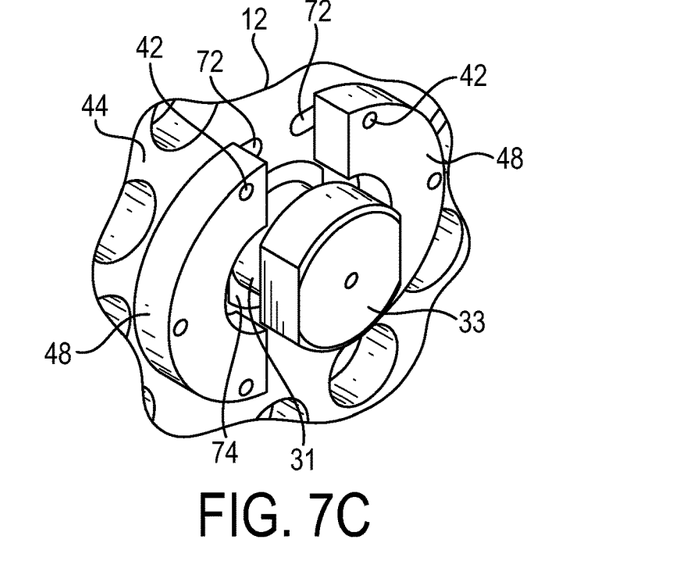

Once loosened, the primary drive nut clam shell bolts 42 may be slid along the elongated pockets 72 from an initial or first position to a second position, as illustrated by comparing FIG. 7B (second position) to FIG. 7A (first position). Again, the primary drive nut clam shell bolts 42 are utilized to position the primary drive screw clam shell 48 against the external side 44 of the fixed plate. As shown in FIG. 7C, the sliding movement of the primary drive nut clam shell bolts 42 along the elongated pockets 72 results in spreading apart the two halves of the primary drive screw claim shell 48. In the locked position, which is shown in FIG. 3, the two clam shell halves are located within a recess in the primary drive screw 30 adjacent to the screw head 33. When the bolts 42 are moved along the elongated pockets 72, the two clam shell halves are moved out of the recess in the primary drive screw 30, now exposed and identified as element 31 in FIG. 7C.

Figure 7D:
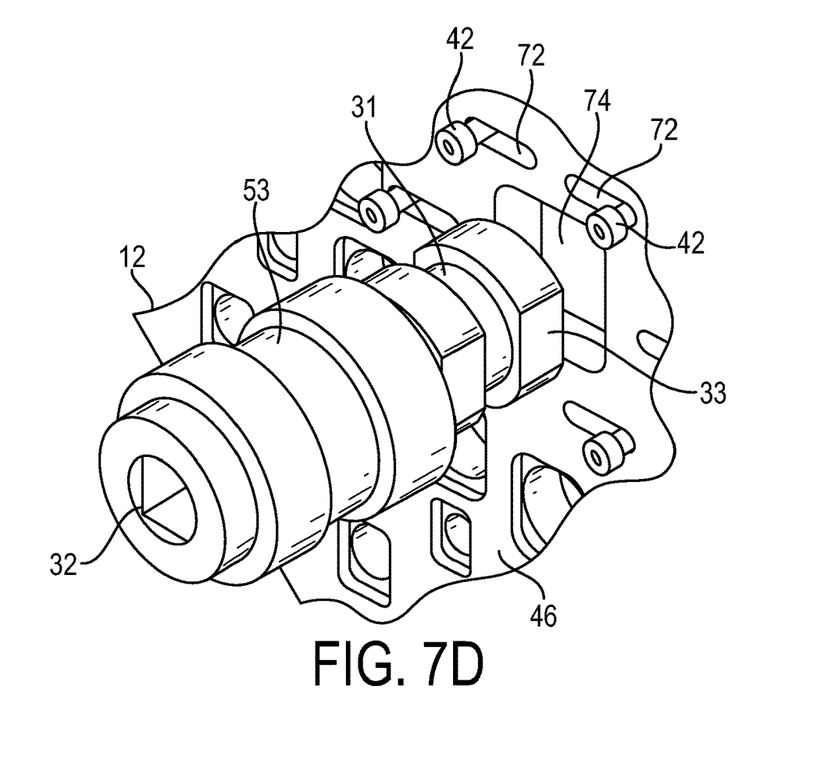

FIG. 7C further depicts the screw head 33 of the primary drive screw, which is positioned adjacent a primary drive screw hole 74 in the fixed plate 12 (the screw hole 74 is best seen in FIG. 7D). In the locked position as described above (see again FIG. 3), the screw head 33 is prevented from pulling through the hole 74 by the clam shell halves of the primary drive screw clam shell 48. Once the clam shell halves are moved to the position of FIG. 7C, however, thereby disengaging with the recess 31, the screw head 33 can now be pulled through the hole 74, as shown in FIG. 7D from the viewpoint of the internal side 46. In this manner, similarly to the satellite drive screw/nut assemblies 52/54, the primary drive screw/nut assembly 30/32 also may be removed from the fixed plate 12 as a unit. Accordingly, even if the primary drive nut 32 and primary drive screw 30 are galled together, the assembly is readily removed without having to cut the components apart, and without having to remove the fixed plate 12 from the base equipment.

After the primary and satellite locking mechanisms are removed, the steps of FIGS. 5-7 may be reversed to install new locking mechanisms. The installation of replacement mechanisms, therefore, also may be performed without removing the fixed plate from the base equipment.

In accordance with the description herein, an aspect of the invention is a multi-coupling. In exemplary embodiments, the multi-coupling includes a fixed plate including a first set of a plurality of fluid holes for communicating fluid through the fixed plate, a free plate including a second set of a plurality of fluid holes for communicating fluid through the free plate, and a primary locking mechanism for locking the free plate to the fixed plate with the first and second sets of fluid holes being aligned to form a plurality of fluid passages through the multi-coupling. The primary locking mechanism includes a first primary coupler secured to the fixed plate that is engaged with a second primary coupler secured to the free plate. A primary securing mechanism secures the first primary coupler to the fixed plate, and the primary securing mechanism is moveable to release the first primary coupler from the fixed plate independently of releasing the first primary coupler from the second primary coupler.

In an exemplary embodiment of the multi-coupling, the first primary coupler extends through the fixed plate from an internal side to an external side, the primary securing mechanism is a clam shell retainer located on the external side of the fixed plate, and halves of the clam shell retainer are movable in an outward radial direction to permit removal of the first primary coupler from the fixed plate.

In an exemplary embodiment of the multi-coupling, the fixed plate clam shell retainer is secured to the fixed plate by a plurality of fixed plate clam shell fasteners that extend through corresponding elongated pockets in the fixed plate, and the fixed plate clam shell fasteners are moveable within the elongated pockets to move the fixed plate clam shell halves in the outward radial direction.

In an exemplary embodiment of the multi-coupling, the second primary coupler extends through the free plate from an internal side to an external side, the second primary coupler is secured to the free plate with a free plate clam shell retainer located on the external side of the free plate, and the free plate clam shell retainer is removable from the free plate independently of the second primary coupler.

In an exemplary embodiment of the multi-coupling, the first primary coupler is a primary drive screw and the second primary coupler is a primary drive nut that threadedly receives the primary drive screw, and the primary drive nut is rotatable relative to the primary drive screw to lock the free plate to the fixed plate.

In an exemplary embodiment of the multi-coupling, the multi-coupling further includes at least one satellite locking mechanism in combination with the primary locking mechanism. The satellite locking mechanism includes a first satellite coupler secured to the fixed plate that is engaged with a second satellite coupler secured to the free plate. A satellite securing mechanism secures the first satellite coupler to the fixed plate, and the satellite securing mechanism is moveable to release the first satellite coupler from the fixed plate independently of releasing the first satellite coupler from the second satellite coupler.

In an exemplary embodiment of the multi-coupling, the primary couplers of the primary locking mechanism are engaged before a proper mating distance for the satellite couplers of the satellite locking mechanisms is achieved.

In an exemplary embodiment of the multi-coupling, the first satellite coupler extends through a slot in the fixed plate from an internal side to an external side. The satellite securing mechanism includes a widened end of the first satellite coupler that in a locked position is oriented transverse to the slot to prevent removal of the first satellite coupler from the fixed plate. The satellite locking mechanism is moveable from the locked position to an unlocked position in which the widened end is oriented commensurately with the slot to permit removal of the first satellite coupler from the fixed plate.

In an exemplary embodiment of the multi-coupling, the second satellite coupler extends through the free plate from an internal side to an external side, the second satellite coupler is secured to the free plate with a satellite clam shell retainer located on the external side of the free plate, and the satellite clam shell retainer is removable from the free plate independently of the second satellite coupler.

In an exemplary embodiment of the multi-coupling, the first satellite coupler is a satellite drive screw and the second satellite coupler is a satellite drive nut that threadedly receives the satellite drive screw, and the satellite drive nut is rotatable relative to the satellite drive screw to further lock the free plate to the fixed plate.

In an exemplary embodiment of the multi-coupling, the multi-coupling has four satellite locking mechanisms regularly spaced around the primary locking mechanism.

Another aspect of the invention is a method of servicing a multi-coupling, wherein the multi-coupling includes: a fixed plate including a first set of a plurality of fluid holes for communicating fluid through the fixed plate, a free plate including a second set of a plurality of fluid holes for communicating fluid through the free plate, and a primary locking mechanism for locking the free plate to the fixed plate with the first and second sets of fluid holes being aligned to form a plurality of fluid passages through the multi-coupling. The primary locking mechanism includes a first primary coupler secured to the fixed plate that is engaged with a second primary coupler secured to the free plate, and a primary securing mechanism that secures the first primary coupler to the fixed plate. The method of servicing the multi-coupling includes the step of moving the primary securing mechanism to release the first primary coupler from the fixed plate independently of releasing the first primary coupler from the second primary coupler.

In an exemplary embodiment of the method of servicing the multi-coupling, the first primary coupler extends through the fixed plate from an internal side to an external side, and the primary securing mechanism is a clam shell retainer located on the external side of the fixed plate. The step of moving the primary securing mechanism to release the first primary coupler from the fixed plate includes moving halves of the fixed plate clam shell retainer in an outward radial direction to free the first primary coupler, and removing the first primary coupler from the fixed plate.

In an exemplary embodiment of the method of servicing the multi-coupling, the fixed plate clam shell retainer is secured to the fixed plate by a plurality of fixed plate clam shell fasteners that extend through corresponding elongated pockets in the fixed plate. The step of moving the primary securing mechanism includes moving the fixed plate clam shell fasteners within the elongated pockets to move the fixed plate clam shell halves in the outward radial direction to free the first primary coupler.

In an exemplary embodiment of the method of servicing the multi-coupling, the method further includes removing the free plate from the fixed plate prior to moving the primary securing mechanism.

In an exemplary embodiment of the method of servicing the multi-coupling, the second primary coupler extends through the free plate from an internal side to an external side, and the second primary coupler is secured to the free plate with a free plate clam shell retainer located on the external side of the free plate. The step of removing the free plate from the fixed plate includes removing the primary free plate clam shell retainer from the free plate independently of the second primary coupler, and removing the free plate from the fixed plate while the second primary coupler remains secured to the first primary coupler and the first primary coupler remains secured to the fixed plate.

In an exemplary embodiment of the method of servicing the multi-coupling, the multi-coupling further includes at least one satellite locking mechanism in combination with the primary locking mechanism. The method of servicing the multi-coupling further includes the step of: after removing the free plate, removing the satellite locking mechanism from the fixed plate and moving the primary securing mechanism.

In an exemplary embodiment of the method of servicing the multi-coupling, the satellite locking mechanism includes a first satellite coupler secured to the fixed plate that is engaged with a second satellite coupler secured to the free plate, the second satellite coupler extends through the free plate from the internal side to the external side, and the second satellite coupler is secured to the free plate with a satellite clam shell retainer located on the external side of the free plate. The step of removing the free plate from the fixed plate further includes removing the satellite clam shell retainer from the free plate independently of the second satellite coupler, and removing the free plate from the fixed plate while the second satellite coupler remains secured to the first satellite coupler and the first satellite coupler remains secured to the fixed plate.

In an exemplary embodiment of the method of servicing the multi-coupling, the satellite locking mechanism further includes a satellite securing mechanism that secures the first satellite coupler to the fixed plate. The step of removing the satellite locking mechanism from the fixed plate includes moving the satellite securing mechanism to release the first satellite coupler from the fixed plate, and removing the first satellite coupler from the fixed plate independently of releasing the first satellite coupler from the second satellite coupler.

In an exemplary embodiment of the method of servicing the multi-coupling, the first satellite coupler extends through a slot in the fixed plate from an internal side to an external side, and the satellite securing mechanism comprises a widened end of the first satellite coupler that in a locked position is oriented transverse to the slot to prevent removal of the first satellite coupler from the fixed plate. The step of removing the satellite locking mechanism from the fixed plate includes moving the satellite locking mechanism from the locked position to an unlocked position in which the widened end is oriented commensurately with the slot to permit removal of the first satellite coupler from the fixed plate.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A multi-coupling comprising:
 a fixed plate including a first set of a plurality of fluid holes for communicating fluid through the fixed plate;

a free plate including a second set of a plurality of fluid holes for communicating fluid through the free plate; and a primary locking mechanism for locking the free plate to the fixed plate with the first and second sets of fluid holes being aligned to form a plurality of fluid passages through the multi-coupling;

wherein the primary locking mechanism comprises:

a first primary coupler secured to the fixed plate that is engaged with a second primary coupler secured to the free plate; and a primary securing mechanism that secures the first primary coupler to the fixed plate, and the primary securing mechanism is moveable to release the first primary coupler from the fixed plate independently of releasing the first primary coupler from the second primary coupler;

wherein:

the first primary coupler extends through the fixed plate from an internal side to an external side;

the primary securing mechanism is a clam shell retainer located on the external side of the fixed plate;

halves of the clam shell retainer are movable in an outward radial direction to permit removal of the first primary coupler from the fixed plate;

the fixed plate clam shell retainer is secured to the fixed plate by a plurality of fixed plate clam shell fasteners that extend through corresponding elongated pockets in the fixed plate; and the fixed plate clam shell fasteners are moveable within the elongated pockets to move the fixed plate clam shell halves in the outward radial direction.

2. The multi-coupling of claim 1, wherein:

the second primary coupler extends through the free plate from an internal side to an external side;

the second primary coupler is secured to the free plate with a free plate clam shell retainer located on the external side of the free plate; and the free plate clam shell retainer is removable from the free plate independently of the second primary coupler.

3. The multi-coupling of claim 1, wherein:

the first primary coupler is a primary drive screw and the second primary coupler is a primary drive nut that threadedly receives the primary drive screw; and the primary drive nut is rotatable relative to the primary drive screw to lock the free plate to the fixed plate.

4. The multi-coupling of claim 1, further comprising at least one satellite locking mechanism in combination with the primary locking mechanism;

the satellite locking mechanism comprising:

a first satellite coupler secured to the fixed plate that is engaged with a second satellite coupler secured to the free plate; and a satellite securing mechanism that secures the first satellite coupler to the fixed plate, and the satellite securing mechanism is moveable to release the first satellite coupler from the fixed plate independently of releasing the first satellite coupler from the second satellite coupler.

5. The multi-coupling of claim 4, wherein the primary couplers of the primary locking mechanism are engaged before a proper mating distance for the satellite couplers of the satellite locking mechanisms is achieved.

6. The multi-coupling of claim 4, wherein:

the first satellite coupler extends through a slot in the fixed plate from the internal side to the external side;

the satellite securing mechanism comprises a widened end of the first satellite coupler that in a locked position is oriented transverse to the slot to prevent removal of the first satellite coupler from the fixed plate; and the satellite locking mechanism is moveable from the locked position to an unlocked position in which the widened end is oriented commensurately with the slot to permit removal of the first satellite coupler from the fixed plate.

7. The multi-coupling of claim 4, wherein:

the second satellite coupler extends through the free plate from an internal side to an external side;

the second satellite coupler is secured to the free plate with a satellite clam shell retainer located on the external side of the free plate; and the satellite clam shell retainer is removable from the free plate independently of the second satellite coupler.

8. The multi-coupling of claim 4, wherein:

the first satellite coupler is a satellite drive screw and the second satellite coupler is a satellite drive nut that threadedly receives the satellite drive screw; and the satellite drive nut is rotatable relative to the satellite drive screw to further lock the free plate to the fixed plate.

9. The multi-coupling of claim 4, wherein the multi-coupling has four satellite locking mechanisms regularly spaced around the primary locking mechanism.

10. A method of servicing a multi-coupling comprising:

providing a multi-coupling wherein the multi-coupling comprises:

a fixed plate including a first set of a plurality of fluid holes for communicating fluid through the fixed plate;

a free plate including a second set of a plurality of fluid holes for communicating fluid through the free plate; and a primary locking mechanism for locking the free plate to the fixed plate with the first and second sets of fluid holes being aligned to form a plurality of fluid passages through the multi-coupling;

wherein the primary locking mechanism comprises:

a first primary coupler secured to the fixed plate that is engaged with a second primary coupler secured to the free plate; and a primary securing mechanism that secures the first primary coupler to the fixed plate;

the method of servicing the multi-coupling further comprising the step of moving the primary securing mechanism to release the first primary coupler from the fixed plate independently of releasing the first primary coupler from the second primary coupler;

wherein:

the first primary coupler extends through the fixed plate from an internal side to an external side, and the primary securing mechanism is a clam shell retainer located on the external side of the fixed plate;

the step of moving the primary securing mechanism to release the first primary coupler from the fixed plate comprising:

moving halves of the fixed plate clam shell retainer in an outward radial direction to free the first primary coupler; and removing the first primary coupler from the fixed plate; and further wherein:

the fixed plate clam shell retainer is secured to the fixed plate by a plurality of fixed plate clam shell fasteners that extend through corresponding elongated pockets in the fixed plate; and the step of moving the primary securing mechanism comprising moving the fixed plate clam shell fasteners within the elongated pockets to move the fixed plate clam shell halves in the outward radial direction to free the first primary coupler.

11. A method of servicing a multi-coupling comprising:
providing a multi-coupling wherein the multi-coupling comprises:
- a fixed plate including a first set of a plurality of fluid holes for communicating fluid through the fixed plate;
- a free plate including a second set of a plurality of fluid holes for communicating fluid through the free plate; and
- a primary locking mechanism for locking the free plate to the fixed plate with the first and second sets of fluid holes being aligned to form a plurality of fluid passages through the multi-coupling;
wherein the primary locking mechanism comprises:
- a first primary coupler secured to the fixed plate that is engaged with a second primary coupler secured to the free plate; and
- a primary securing mechanism that secures the first primary coupler to the fixed plate;

the method of servicing the multi-coupling further comprising the steps of:
moving the primary securing mechanism to release the first primary coupler from the fixed plate independently of releasing the first primary coupler from the second primary coupler; and
removing the free plate from the fixed plate prior to moving the primary securing mechanism;
wherein:
the second primary coupler extends through the free plate from an internal side to an external side, and the second primary coupler is secured to the free plate with a free plate clam shell retainer located on the external side of the free plate;
the step of removing the free plate from the fixed plate comprising:
removing the free plate clam shell retainer from the free plate independently of the second primary coupler; and
removing the free plate from the fixed plate while the second primary coupler remains secured to the first primary coupler and the first primary coupler remains secured to the fixed plate.

12. The method claim 11, wherein:
the multi-coupling further comprises at least one satellite locking mechanism in combination with the primary locking mechanism;
the method of servicing the multi-coupling comprising the step of: after removing the free plate, removing the satellite locking mechanism from the fixed plate and moving the primary securing mechanism.

13. The method claim 12, wherein:
the satellite locking mechanism comprises a first satellite coupler secured to the fixed plate that is engaged with a second satellite coupler secured to the free plate;
the second satellite coupler extends through the free plate from the internal side to the external side; and
the second satellite coupler is secured to the free plate with a satellite clam shell retainer located on the external side of the free plate;
the step of removing the free plate from the fixed plate further comprising:
removing the satellite clam shell retainer from the free plate independently of the second satellite coupler; and
removing the free plate from the fixed plate while the second satellite coupler remains secured to the first satellite coupler and the first satellite coupler remains secured to the fixed plate.

14. The method of claim 13, wherein:
the satellite locking mechanism further comprises a satellite securing mechanism that secures the first satellite coupler to the fixed plate;
the step of removing the satellite locking mechanism from the fixed plate comprising:
moving the satellite securing mechanism to release the first satellite coupler from the fixed plate; and
removing the first satellite coupler from the fixed plate independently of releasing the first satellite coupler from the second satellite coupler.

15. The multi-coupling of claim 14, wherein:
the first satellite coupler extends through a slot in the fixed plate from an internal side to an external side; and
the satellite securing mechanism comprises a widened end of the first satellite coupler that in a locked position is oriented transverse to the slot to prevent removal of the first satellite coupler from the fixed plate;
the step of removing the satellite locking mechanism from the fixed plate comprising moving the satellite locking mechanism from the locked position to an unlocked position in which the widened end is oriented commensurately with the slot to permit removal of the first satellite coupler from the fixed plate.

* * * * *